United States Patent [19]

Plasse

[11] 4,116,735

[45] Sep. 26, 1978

[54] METHOD FOR THE MANUFACTURE OF A SPRING-INTERIOR MATTRESS

[76] Inventor: Robert Plasse, 6 Blvd. Anatole, Lyon 6 (Rhone), France

[21] Appl. No.: 738,975

[22] Filed: Nov. 4, 1976

[30] Foreign Application Priority Data

Apr. 5, 1976 [FR] France ................................ 76 13996

[51] Int. Cl.[2] ........................... B68G 7/00; B32B 5/18; B32B 31/12

[52] U.S. Cl. ........................................... 156/79; 5/351; 264/46.5; 264/46.7; 428/119; 428/313

[58] Field of Search ..................... 264/46.5, 46.7, 45.8; 428/119, 120, 313, 72, 76; 5/351, 355; 156/78, 79, 242, 291, 297

[56] References Cited

U.S. PATENT DOCUMENTS

| | | | |
|---|---|---|---|
| 3,099,518 | 7/1963 | Wetzler | 156/79 |
| 3,116,196 | 12/1963 | Terry | 156/79 |
| 3,204,016 | 8/1965 | Sanger et al. | 264/46.7 |
| 3,459,611 | 8/1969 | Joseph et al. | 156/78 |
| 3,920,609 | 11/1975 | Lehmann | 264/46.5 |

*Primary Examiner*—Douglas J. Drummond
*Assistant Examiner*—Thomas Bokan
*Attorney, Agent, or Firm*—Remy J. VanOphem

[57] ABSTRACT

A method of making a mattress comprising a framework of metal springs sandwiched between first and second sheets of foam, comprises applying a strip of foamable resin mixture around the periphery of the upper surface the first sheet of foam being disposed horizontally, and then laying the framework on the upper surface. The strip is allowed to foam to engulf at least a portion of the lower part of the framework which is thus adhered to the first sheet. The framework is then similarly adhered to the second sheet.

7 Claims, 9 Drawing Figures

FIG.8
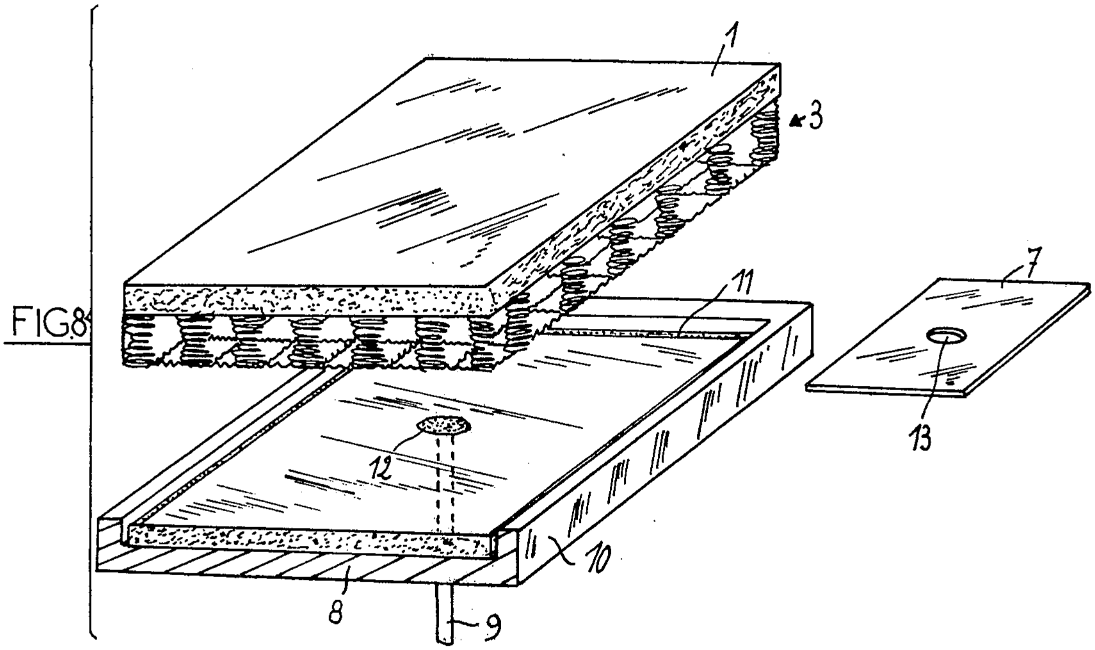
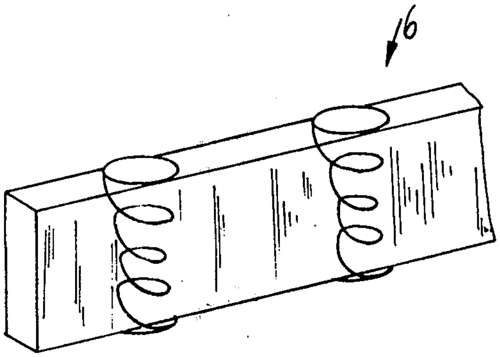
FIG.9

METHOD FOR THE MANUFACTURE OF A SPRING-INTERIOR MATTRESS

The present invention relates to a method for the manufacture of a spring-interior mattress, as well as the mattress obtained by carrying out the method.

Various methods are known for manufacturing a spring-interior mattress comprising two sheets of foam on either side of a metal framework. These methods generally consist of allowing the foam to form around the springs, such that each end of a spring is embedded in one of the sheets of foam.

The object of the present invention is to provide a spring-interior mattress of the same type with a lower cost price.

A method according to the invention, for the manufacture of a mattress comprising two sheets of foam on either side of a metal framework of springs is characterised in that it comprises the following successive stages:

a sheet of foam is placed such that its inner side is turned upwards and is substantially horizontal, a strand of a foam-producing mixture is placed along the periphery of the inner side of this sheet of foam, The metal framework is placed on said sheet of foam, the foam is allowed to form and expand freely, such that the latter surrounds at least partly the lower coil of the peripheral springs of the framework, in order to fix said framework on the sheet.

According to an additional feature of the invention, the same operations are carried out with a second sheet of foam and the same framework which is already connected to the first sheet of foam after said framework has been turned over.

According to an additional feature of the invention, each sheet of foam is placed on a substantially horizontal, flat base which is provided with a rim which extends upwards beyond the sheet of foam in order to ensure centering of the metal framework with respect to said sheet of foam.

According to an additional feature of the invention, a base is used which is mounted to rotate about a central vertical axis, such that the strand of foam-producing mixture is deposited by an operator who remains substantially at the same point, whilst the periphery of the sheet of foam travels in front of him.

According to an additional feature of the invention, at least one spot of foam-producing mixture is placed at the centre of the sheet in order that the foam is formed and expands, thus surrounding, at least partly, the lower coils of the springs located at the center of the framework.

According to an additional feature of the invention, a strip of foam is placed all around the framework, between the two sheets of foam, such that this strip is retained locally, firstly by each peripheral spring of the framework and secondly by the strand of expanding foam, when said strand partly covers the base of the peripheral springs.

According to an additional feature of the invention, the strip of pre-fabricated foam is placed around the framework before placing the framework on the first sheet of pre-fabricated foam.

A mattress obtained by carrying out the method according to the invention is characterised in that each end coil of the peripheral springs of the framework extends as far as the edge of the adjacent sheet of foam, where said end coil is partly embedded in a strand of foam which sticks to the foam of the adjacent pre-fabricated sheet.

According to an additional feature of the invention, the mattress is provided with a pre-fabricated peripheral strip of foam, whose outer side substantially forms an extension of the edges of the sheets of foam located on either side and which sticks by each of its upper and lower edges to a strand of foam itself sticking to the adjacent pre-fabricated sheet of foam and partly covering one end coil of each peripheral spring of the metal framework.

The accompanying drawings, given as a non-limiting example, will make it easier to understand the features of the invention.

FIGS. 6 to 8 are perspective views illustrating the various stages of the method of manufacture according to the invention.

FIG. 9 is a partial perspective view of the peripheral strip of foam, on the inner side.

Figure 1:
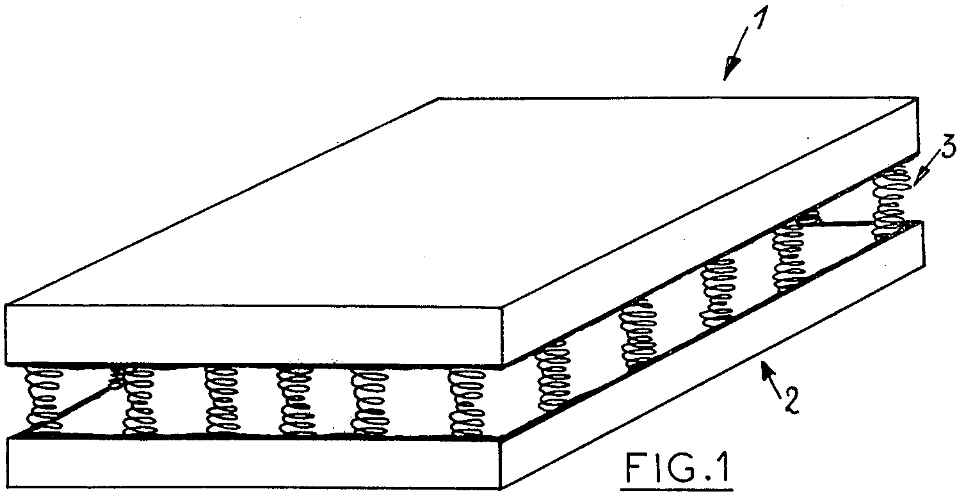
FIG. 1 is a perspective view of a mattress obtained by carrying out the method according to the invention.

The mattress illustrated in FIG. 1 comprises in conventional manner, a first sheet of foam 1 and a second sheet of foam 2 on either side of a metal framework 3 containing all the springs.

Figure 2:
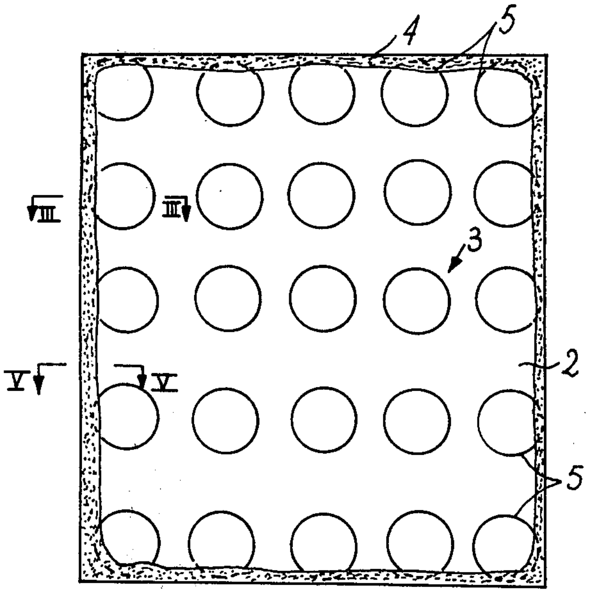
FIG. 2 is a plan view of this mattress, without the upper sheet of foam.
Figure 3:
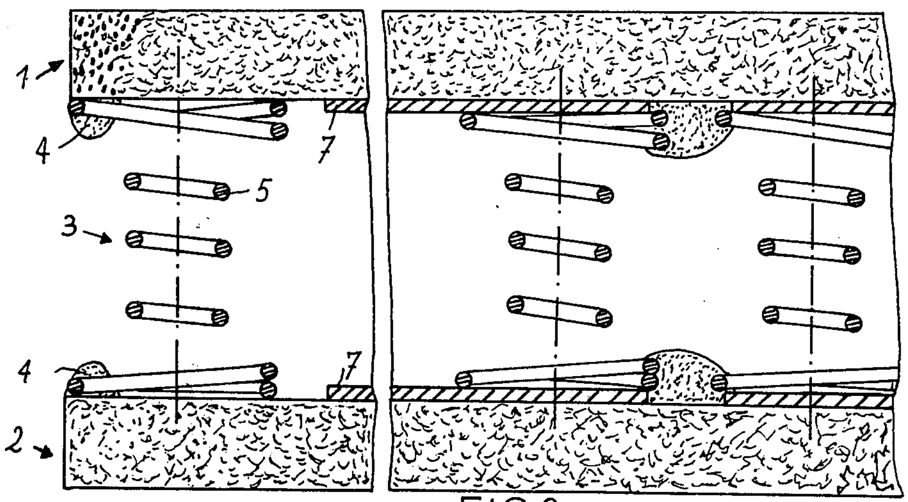
FIG. 3 is a section on line III—III (FIG. 2).

According to the invention, each sheet of foam is pre-fabricated and stuck to the metal framework 3 by means of a peripheral strand of foam 4, i.e. of resin (FIGS. 2 and 3) which sticks to the adjacent pre-fabricated sheet of foam, whilst partly surrounding an end coil of a series of peripheral springs 5.

Figure 4:
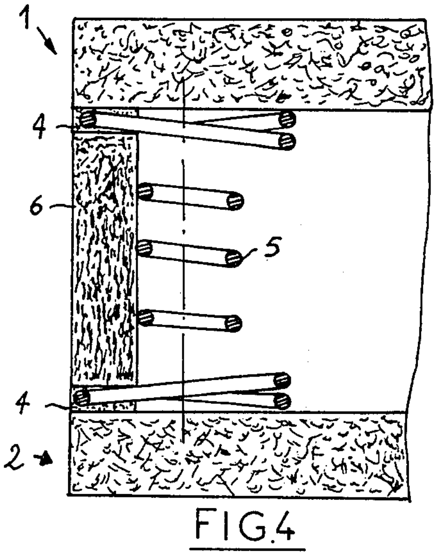
FIG. 4 is a section III—III (FIG. 2), the framework also being provided with a pre-fabricated peripheral strip of foam.
Figure 5:
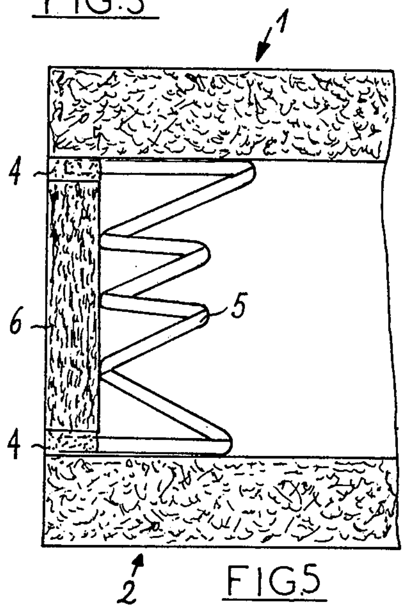
FIG. 5 is a section V—V (FIG. 2) of the mattress provided with the strip of foam.

In the case of FIGS. 4 and 5, the framework 3 is also surrounded by a strip of pre-fabricated foam 6, the upper and lower edges of which are stuck to the strand of foam 4. This strip 6 is fitted into each peripheral spring 5, the end coils of these springs extending partly on either side of the strip 6, whereas the intermediate coils, of smaller radius, are adjacent the inner side of the strip 6 (FIG. 9).

The method of manufacture according to the invention is as follows.

A flat and horizontal base 8 (FIG. 6) is used, which is mounted to rotate about a central vertical shaft 9 and which is provided with a rim 10 higher than the sheets of foam 1 and 2. The inner perimeter of the rim 10 corresponds substantially to the outer perimeter of the sheets 1 and 2.

Firstly, the sheet of foam 1 is placed on the base 8, such that the inner side of said sheet 1 is turned upwards. An operator then applies a strand 11 of resin, i.e. a foam-producing mixture, along the edge of the sheet 1. The operator remains substantially at the same point for applying the strand 11, whilst the base 8 rotates about the shaft 9.

Figure 7:
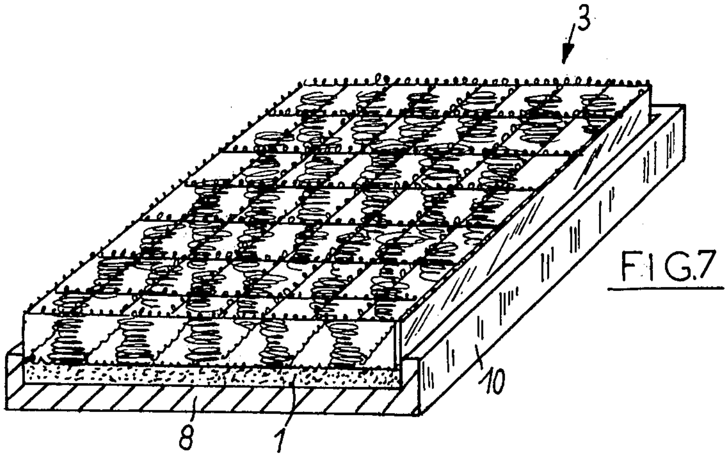

Immediately after and before the resin mixture 11 is transformed into foam, the framework 3 is placed on the sheet 1. When the foam forms and expands, the latter continues to stick to the sheet 1, whilst partly surrounding the lower coil of each peripheral spring 5 (FIG. 7).

Allowing the foam of the strand 11 to expand freely, without any limit to its volume, makes it possible to obtain polymerisation of the material, as well as hardening of the latter in a short period of time.

When the resin of the strand 11 has become a strand of foam 4, the sheet 1 is withdrawn from the base 8, which sheet is now integral with the framework 3 and the sheet of pre-fabricated foam 2 is placed on the base 8. A strand 11 of foam-producing mixture is applied to the sheet 2 (FIG. 8), then the framework 3 is finally placed on the latter, after it has been turned over.

Centering of the framework 3 with respect to the sheet 1, then with respect to the sheet 2 is automatically achieved by means of the rim 10 of the base 8.

If one desires a mattress provided with a strip of pre-fabricated foam (FIGS. 4 and 5), the latter is placed around the framework 3 before placing the framework on the sheet 1. The strip 6 sticks automatically to the resin of each strand 4, whereas the rim 10 of the base 8 retains this strip in the extension of the edges of the prefabricated sheets of foam 1 and 2.

Figure 6:
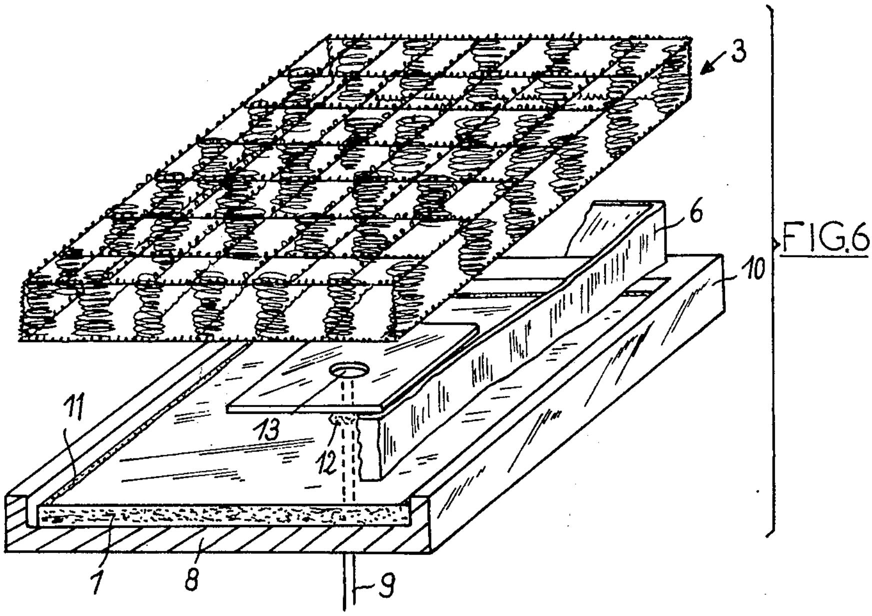

To increase the rigidity of the mattress it is possible to apply a spot 12 of resin to the center of each sheet 1 and 2, at the same time that the resin of the strands 11 is applied (FIGS. 6 and 8). Each sheet is thus stuck at its center to the metal framework.

Before placing the framework 3 on each sheet of pre-fabricated foam, it is also possible to place an insulation member 7 constituted by a piece of material on these same sheets. This insulation member insulates the framework from each sheet of pre-fabricated foam, in order to prevent the framework from damaging the sheets, when in use. The insulation member may completely cover each sheet of pre-fabricated foam.

When it is desired to use such an insulator, an opening 13 is preveiously cut at its center (FIG. 6) and this opening is placed above the spot 12 previously applied to the sheet of pre-fabricated foam. When the resin of the spot 12 is transformed into foam (FIG. 3), the latter passes through the opening 13 in order to stick simultaneously to:

the adjacent sheet of pre-fabricated foam,
the insulator 7, and
the framework 3.

It will be seen that the application of strands 11 and spots 12 of resin lead to partial and flexible embedding of the metal framework by a method of adhesion.

The method is particularly economical to carry out. It requires the use of only inexpensive equipment, since it is not necessary to use a mould, but only a base. Finally, the sheets of foam 1 and 2 may be cut from a block of pre-fabricated foam instead of being formed in place around the framework 3.

What is claimed is:

1. A method of manufacturing a mattress comprising two sheets of foam on either side of a metal framework comprising springs, the method comprising the following successive stages:

a sheet of pre-fabricated foam is placed such that its inner side is turned upwards and is substantially horizontal;

a strand of resin forming a foam-producing mixture is applied along the periphery of the inner side of this pre-fabricated sheet of foam;

the metal framework is placed on said sheet of foam;

the foam of the resin strand is allowed to form and expand freely, such that the latter at least partly surrounds the lower coil of the peripheral springs of the framework, in order to fix said framework to the sheet; and repeating the same operations with a second sheet of pre-fabricated foam and the same framework which is already integral with the first sheet of foam, after said framework has been turned over.

2. A method according to claim 1 in which each sheet of pre-fabricated foam is placed on a flat, substantially horizontal base which is provided with a rim extending upwards beyond the sheet of pre-fabricated foam, in order to ensure centering of the metal framework with respect to said pre-fabricated sheet of foam.

3. A method according to claim 2, in which there is used a base mounted to rotate about a central vertical shaft, such that the strand of resin or a foam-producing mixture is applied by an operator who remains substantially at the same point, whilst the periphery of the pre-fabricated sheet of foam travels in front of him.

4. A method according to claim 1 in which one also applies a spot fo foam-producing mixture or resin to the center of the pre-fabricated sheet of foam in order that the foam forms and expands, at least partly surrounding the lower coils of the springs located close to the center of the framework and thus sticking to the framework and said pre-fabricated sheet of foam.

5. A method according to claim 4, in which before placing the framework on the pre-fabricated sheet of foam provided with the spot of resin, an insulating member constituted by a piece of material perforated at its center is placed on said sheet, such that the foam coming from the central spot expands, thus sticking simultaneously to the pre-fabricated sheet of foam, to the insulating member and to the framework, passing through the central perforation in the insulation member.

6. A method according to claim 1, in which a strip of pre-fabricated foam is placed all around the framework, between the two sheets of foam, such that this strip is stuck to the resin of the peripheral strand of foam, whilst also being fitted in each peripheral spring of the framework, each of these springs comprising two end coils of large diameter which extend partly on either side of the strip of pre-fabricated foam and several intermediate coils of smaller diameter which remain adjacent the inner face of the pre-fabricated strip of foam.

7. A method according to claim 6, in which the pre-fabricated strip of foam is placed around the framework before the framework is placed on the first pre-fabricated sheet of foam.

* * * * *

UNITED STATES PATENT AND TRADEMARK OFFICE

CERTIFICATE OF CORRECTION

PATENT NO. : 4,116,735

DATED : September 26, 1978

INVENTOR(S) : Robert Plasse

It is certified that error appears in the above-identified patent and that said Letters Patent are hereby corrected as shown below:

Column 3, line 11, following "latter" delete the comma.

Column 4, line 30, delete "fo" and insert ----of----.

Signed and Sealed this

*Thirtieth* Day of *January 1979*

[SEAL]

*Attest:*

RUTH C. MASON
*Attesting Officer*

DONALD W. BANNER
*Commissioner of Patents and Trademarks*